(12) United States Patent
Dewanjee

(10) Patent No.: US 6,607,686 B2
(45) Date of Patent: Aug. 19, 2003

(54) THERMOSETTING POLYURETHANE MATERIAL FOR A GOLF BALL

(75) Inventor: Pijush K. Dewanjee, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 09/683,001

(22) Filed: Nov. 6, 2001

(65) Prior Publication Data

US 2002/0119833 A1 Aug. 29, 2002

Related U.S. Application Data

(60) Continuation-in-part of application No. 09/562,782, filed on May 2, 2000, now Pat. No. 6,511,388, which is a division of application No. 09/295,635, filed on Apr. 20, 1999, now Pat. No. 6,117,024.

(51) Int. Cl.[7] ............................ A63B 37/12; C08G 18/10
(52) U.S. Cl. .................... 264/279.1; 264/275; 524/130; 524/710; 528/64; 528/72; 473/373; 473/374; 473/378
(58) Field of Search .................. 524/130, 710; 528/64, 72; 473/373, 374, 378; 264/275, 279.1

(56) References Cited

U.S. PATENT DOCUMENTS

| | | |
|---|---|---|
| 721,462 A | 2/1903 | Richards |
| 2,940,128 A | 6/1960 | Bowerman et al. |
| 3,034,791 A | 5/1962 | Gallagher |
| 3,112,521 A | 12/1963 | Ward |
| 3,130,102 A | 4/1964 | Watson et al. |
| 3,147,324 A | 9/1964 | Ward |
| 3,177,280 A | 4/1965 | Ford et al. |
| 3,616,101 A | 10/1971 | Satchell et al. |
| 3,979,126 A | 9/1976 | Dusbiber |
| 3,989,568 A | 11/1976 | Isaac |
| 4,062,825 A | 12/1977 | Watabe et al. |
| 4,123,061 A | 10/1978 | Dusbiber |
| 4,248,432 A | 2/1981 | Hewitt et al. |
| 4,274,637 A | 6/1981 | Molitor |
| 4,321,183 A | 3/1982 | Cox et al. |
| 4,349,657 A | 9/1982 | Holloway |
| 4,431,193 A | 2/1984 | Nesbitt |
| 4,442,282 A | 4/1984 | Kolycheck |
| 4,650,193 A | 3/1987 | Molitor et al. |
| 4,674,751 A | 6/1987 | Molitor et al. |
| 4,870,142 A | 9/1989 | Czerwinski et al. |
| 5,006,297 A | 4/1991 | Brown et al. |
| 5,047,495 A | 9/1991 | Kolycheck |
| 5,098,105 A | 3/1992 | Sullivan |
| 5,159,053 A | 10/1992 | Kolycheck et al. |
| 5,334,673 A | 8/1994 | Wu |
| 5,368,304 A | 11/1994 | Sullivan et al. |
| 5,484,870 A | 1/1996 | Wu |
| 5,688,191 A | 11/1997 | Cavallaro et al. |
| 5,692,974 A | 12/1997 | Wu et al. |
| 5,703,193 A | 12/1997 | Rosenberg et al. |
| 5,719,229 A | * 2/1998 | Pantone |
| 5,733,428 A | 3/1998 | Calabria et al. |
| 5,779,562 A | 7/1998 | Melvin et al. |
| 5,803,831 A | 9/1998 | Sullivan et al. |
| 5,813,923 A | 9/1998 | Cavallaro et al. |
| 5,816,937 A | 10/1998 | Shimosaka et al. |
| 5,885,172 A | 3/1999 | Hebert et al. |
| 5,888,437 A | 3/1999 | Calabria et al. |
| 5,897,884 A | 4/1999 | Calabria et al. |
| 5,899,822 A | 5/1999 | Yamagishi et al. |
| 5,908,358 A | 6/1999 | Wu |
| 5,929,189 A | 7/1999 | Ichikawa et al. |
| 5,935,021 A | 8/1999 | Kashiwagi et al. |
| 5,947,843 A | 9/1999 | Calabria et al. |
| 5,961,401 A | 10/1999 | Masutani et al. |
| 5,984,806 A | 11/1999 | Sullivan et al. |
| 5,993,968 A | 11/1999 | Umezawa et al. |
| 6,015,356 A | 1/2000 | Sullivan et al. |
| 6,037,419 A | 3/2000 | Takesue et al. |
| 6,042,488 A | 3/2000 | Sullivan et al. |
| 6,042,768 A | 3/2000 | Calabria et al. |
| 6,054,550 A | 4/2000 | Umezawa et al. |
| 6,057,403 A | 5/2000 | Sullivan et al. |
| 6,126,558 A | 10/2000 | Higuchi et al. |
| 6,309,313 B1 | 10/2001 | Peter |

FOREIGN PATENT DOCUMENTS

| | | |
|---|---|---|
| GB | 869490 | 10/1959 |
| GB | 901910 | 10/1959 |
| GB | 952212 | 3/1961 |
| GB | 997663 | 4/1962 |
| GB | 1047254 | 5/1963 |
| GB | 1136166 | 2/1966 |
| GB | 2278609 | 1/1994 |
| WO | WO 99/43394 | 9/1999 |

* cited by examiner

Primary Examiner—David J. Buttner
(74) Attorney, Agent, or Firm—Michael A. Catania; Elaine H. Lo

(57) ABSTRACT

A prepolymer blend for a thermosetting polyurethane material that allows for control of the reaction time is disclosed herein. The prepolymer blend is preferably composed of a polyurethane prepolymer and dimethyl methylphosphonate. The thermosetting polyurethane is preferably utilized as a cover for a golf ball. The cover is preferably formed over a core and boundary layer.

4 Claims, 1 Drawing Sheet

THERMOSETTING POLYURETHANE MATERIAL FOR A GOLF BALL

CROSS REFERENCES TO RELATED APPLICATIONS

The Present Application is a continuation-in-part application of U.S. patent application Ser. No. 09/562,782, filed on May 2, 2000, now U.S. Pat. No. 6,511,388, which is a divisional application of U.S. patent application Ser. No. 09/295,635, filed on April 20, 1999, now U.S. Pat. No. 6,117,024.

FEDERAL RESEARCH STATEMENT

[Not Applicable]

BACKGROUND OF INVENTION

1. Field of the Invention

The present invention relates to a thermosetting polyurethane material. More specifically, the present invention relates to a thermosetting polyurethane material for a cover of a golf ball.

2. Description of the Related Art

Conventionally golf balls are made by molding a cover around a core. The core may be wound or solid. A wound core typically comprises elastic thread wound about a solid or liquid center. Unlike wound cores, solid cores do not include a wound elastic thread layer. Solid cores typically may comprise a single solid piece center or a solid center covered by one or more mantle or boundary layers of material.

The cover may be injection molded, compression molded, or cast over the core. Injection molding typically requires a mold having at least one pair of mold cavities, e.g., a first mold cavity and a second mold cavity, which mate to form a spherical recess. In addition, a mold may include more than one mold cavity pair.

In one exemplary injection molding process each mold cavity may also include retractable positioning pins to hold the core in the spherical center of the mold cavity pair. Once the core is positioned in the first mold cavity, the respective second mold cavity is mated to the first to close the mold. A cover material is then injected into the closed mold. The positioning pins are retracted while the cover material is flowable to allow the material to fill in any holes caused by the pins. When the material is at least partially cured, the covered core is removed from the mold.

As with injection molding, compression molds typically include multiple pairs of mold cavities, each pair comprising first and second mold cavities that mate to form a spherical recess. In an exemplary compression molding process, a cover material is pre-formed into half-shells, which are placed into a respective pair of compression mold cavities. The core is placed between the cover material half-shells and the mold is closed. The core and cover combination is then exposed to heat and pressure, which cause the cover half-shells to combine and form a full cover.

As with the above-referenced processes, a casting process also utilizes pairs of mold cavities. In a casting process, a cover material is introduced into a first mold cavity of each pair. Then, a core is held in position (e.g. by an overhanging vacuum or suction apparatus) to contact the cover material that will be the spherical center of the mold cavity pair. Once the cover material is at least partially cured (e.g., a point where the core will not substantially move), the core is released, the cover material is introduced into a second mold cavity of each pair, and the mold is closed. The closed mold is then subjected to heat and pressure to cure the cover material thereby forming a cover on the core. With injection molding, compression molding, and casting, the molding cavities typically include a negative dimple pattern to impart a dimple pattern on the cover during the molding process.

Materials previously used as golf ball covers include balata (natural or synthetic), gutta-percha, ionomeric resins (e.g., DuPont's SURLYN®), and polyurethanes. Balata is the benchmark cover material with respect to sound (i.e. the sound made when the ball is hit by a golf club) and feel (i.e. the sensation imparted to the golfer when hitting the ball). Natural balata is derived from the Bully Cum tree, while synthetic balata is derived from a petroleum compound. Balata is expensive compared to other cover materials, and golf balls covered with balata tend to have poor durability (i.e. poor cut and shear resistance). Gutta percha is derived from the Malaysian sapodilla tree. A golf ball covered with gutta percha is considered to have a harsh sound and feel as compared to balata covered golf balls.

Ionomeric resins, as compared to balata, are typically less expensive and tend to have good durability. However, golf balls having ionomeric resin covers typically have inferior sound and feel, especially as compared to balata covers.

A golf ball with a polyurethane cover generally has greater durability than a golf ball with a balata cover. The polyurethane covered golf ball generally has a better sound and feel than a golf ball with an ionomeric resin cover. Polyurethanes may be thermoset or thermoplastic. Polyurethanes are formed by reacting a prepolymer with a polyfunctional curing agent, such as a polyamine or a polyol. The polyurethane prepolymer is the reaction product of, for example, a diisocyanate and a polyol such as a polyether or a polyester. Several patents describe the use of polyurethanes in golf balls. However, golf balls with polyurethane covers usually do not have the distance of other golf balls such as those with covers composed of SURLYN® materials.

Gallagher, U.S. Pat. No. 3,034,791 discloses a polyurethane golf ball cover prepared from the reaction product of poly(tetramethylene ether) glycol and toluene-2,4-diisocyanates (TDI), either pure TDI or an isomeric mixture.

Isaac, U.S. Pat. No. 3,989,568 (the '568 patent) discloses a polyurethane golf ball cover prepared from prepolymers and curing agents that have different rates of reaction so a partial cure can be made. The '568 patent explains that the minimum number of reactants is three. Specifically, in '568 patent, two or more polyurethane prepolymers are reacted with at least one curing agent, or at least one polyurethane prepolymer is reacted with two or more curing agents as long as the curing agents have different rates of reaction. The '568 patent also explains that [o]ne of the great advantages of polyurethane covers made in accordance with the instant invention is that they may be made very thin . . . , and [t]here is no limitation on how thick the cover of the present invention may be but it is generally preferred . . . that the cover is no more than about 0.6 inches in thickness. The examples in the '568 patent only disclose golf balls having covers that are about 0.025 inches thick.

Similar to Isaac, PCT International Publication Number WO 99/43394 to Dunlop Maxfli Sports Corporation, discloses using two curing agents to control the reaction time for polyurethane formation. The two curing agents are a dimethylthio 2,4-toluenediamine and diethyl 2,4- toluenediamine, which are blended to control the reaction rate of a toluene diisocyanate based polyurethane prepolymer or a 4,4'-diphenylmethane diisocyanate based polyurethane prepolymer.

Dusbiber, U.S. Pat. No. 4,123,061 (the '061 patent) discloses a polyurethane golf ball cover prepared from the reaction product of a polyether, a diisocyanate and a curing agent. The '061 patent discloses that the polyether may be polyalkylene ether glycol or polytetramethylene ether glycol. The '061 patent also discloses that the diisocyanate may be TDI, 4,4'-diphenylmethane diisocyanate (MDI), and 3,3'-dimethyl-4,4'-biphenylene diisocyanate (TODI). Additionally, the '061 patent discloses that the curing agent may be either a polyol (either tri- or tetra-functional and not di-functional) such as triisopropanol amine (TIPA) or trimethoylol propane (TMP), or an amine-type having at least two reactive amine groups such as: 3,3' dichlorobenzidene; 3,3' dichloro 4,4' diamino diphenyl methane (MOCA); N,N,N',N" tetrakis (2-hydroxy propyl) ethylene diamine; or Uniroyal's Curalon L which is an aromatic diamine mixture.

Hewitt, et al., U.S. Pat. No. 4,248,432 (the '432 patent) discloses a thermoplastic polyesterurethane golf ball cover formed from a reaction product of a polyester glycol (molecular weight of 800–1500) (aliphatic diol and an aliphatic dicarboxylic acid) with a para-phenylene diisocyanate (PPDI) or cyclohexane diisocyanate in the substantial absence of curing or crosslinking agents. The '432 patent teaches against the use of chain extenders in making polyurethanes. The '432 patent states, when small amounts of butanediol-1,4 are mixed with a polyester . . . the addition results in polyurethanes that do not have the desired balance of properties to provide good golf ball covers. Similarly, the use of curing or crosslinking agents is not desired.

Holloway, U.S. Pat. No. 4,349,657 (the '657 patent) discloses a method for preparing polyester urethanes with PPDI by reacting a polyester (e.g. prepared from aliphatic glycols having 2–8 carbons reacted with aliphatic dicarboxylic acids having 4–10 carbons) with a molar excess of PPDI to obtain an isocyanate-terminated polyester urethane (in liquid form and stable at reaction temperatures), and then reacting the polyester urethane with additional polyester. The '657 patent claims that the benefit of this new process is the fact that a continuous commercial process is possible without stability problems. The '657 patent further describes a suitable use for the resultant material to be golf ball covers.

Wu, U.S. Pat. No. 5,334,673 (the '673 patent) discloses a polyurethane prepolymer cured with a slow-reacting curing agent selected from slow-reacting polyamine curing agents and difunctional glycols (i.e., 3,5-dimethylthio-2,4-toluenediamine, 3,5-dimethylthio-2,6-toluenediamine, N,N'-dialkyldiamino diphenyl methane, trimethyleneglycol-di-p-aminobenzoate, polytetramethyleneoxide-di-p-aminobenzoate, 1,4-butanediol, 2,3-butanediol, 2,3-dimethyl-2,3-butanediol, ethylene glycol, and mixtures of the same). The polyurethane prepolymer in the '673 patent is disclosed as made from a polyol (e.g., polyether, polyester, or polylactone) and a diisocyanate such as MDI or TODI. The polyether polyols disclosed in the '673 patent are polytetramethylene ether glycol, poly (oxypropylene) glycol, and polybutadiene glycol. The polyester polyols disclosed in the '673 patent are polyethylene adipate glycol, polyethylene propylene adipate glycol, and polybutylene adipate glycol. The polylactone polyols disclosed in the '673 patent are diethylene glycol initiated caprolactone, 1,4-butanediol initiated caprolactone, trimethylol propane initiated caprolactone, and neopentyl glycol initiated caprolactone.

Cavallaro, et al., U.S. Pat. No. 5,688,191 discloses a golf ball having core, mantle layer and cover, wherein the mantle layer is either a vulcanized thermoplastic elastomer, functionalized styrene-butadiene elastomer, thermoplastic polyurethane, metallocene polymer or blends of the same and thermoset materials.

Wu, et al., U.S. Pat. No. 5,692,974 discloses golf balls having covers and cores that incorporate urethane ionomers (i.e. using an alkylating agent to introduce ionic interactions in the polyurethane and thereby produce cationic type ionomers).

Sullivan, et al., U.S. Pat. No. 5,803,831 (the '831 patent) discloses a golf ball having a multi-layer cover wherein the inner cover layer has a hardness of at least 65 Shore D and the outer cover layer has a hardness of 55 Shore D or less, and more preferably 48 Shore D or less. The '831 patent explains that this dual layer construction provides a golf ball having soft feel and high spin on short shots, and good distance and average spin on long shots. The '831 patent provides that the inner cover layer can be made from high or low acid ionomers such as SURLYN®, ESCOR® or IOTEK®, or blends of the same, nonionomeric thermoplastic material such as metallocene catalyzed polyolefins or polyamides, polyamide/ionomer blends, polyphenylene ether/ionomer blends, etc., (having a Shore D hardness of at least 60 and a flex modulus of more than 30000 psi), thermoplastic or thermosetting polyurethanes, polyester elastomers (e.g. HYTREL®), or polyether block amides (e.g. PEBAX®), or blends of these materials. The '831 patent also provides that the outer cover layer can be made from soft low modulus (i.e. 1000–10000 psi) material such as low-acid ionomers, ionomeric blends, non-ionomeric thermoplastic or thermosetting materials such as polyolefins, polyurethane (e.g. thermoplastic polyurethanes like TEXIN®, PELETHANE®, and thermoset polyurethanes like those disclosed in Wu, U.S. Pat. No. 5,334,673), polyester elastomer (e.g. HYTREL®), or polyether block amide (e.g. PEBAX®), or a blend of these materials.

Hebert, et al., U.S. Pat. No. 5,885,172 (the '172 patent) discloses a multilayer golf ball giving a progressive performance (i.e. different performance characteristics when struck with different clubs at different head speeds and loft angles) and having an outer cover layer formed of a thermoset material with a thickness of less than 0.05 inches and an inner cover layer formed of a high flexural modulus material. The '172 patent provides that the outer cover is made from polyurethane ionomers as described in Wu, et al., U.S. Pat. No. 5,692,974, or thermoset polyurethanes such as TDI or methylenebis-(4-cyclohexyl isocyanate) (HMDI), or a polyol cured with a polyamine (e.g. methylenedianiline (MDA)), or with a trifunctional glycol (e.g., N,N,N',N'-tetrakis(2-hydroxpropyl)ethylenediamine). The '172 also provides that the inner cover has a Shore D hardness of 65–80, a flexural modulus of at least about 65,000 psi, and a thickness of about 0.020–0.045 inches. Exemplary materials for the inner cover are ionomers, polyurethanes, polyetheresters (e.g. HYTREL®) polyetheramides (e.g., PEBAX®), polyesters, dynamically vulcanized elastomers, functionalized styrene-butadiene elastomer, metallocene polymer, blends of these materials, nylon or acrylonitrile-butadiene-styrene copolymer.

Wu, U.S. Pat. No. 5,484,870 (the '870 patent) discloses golf balls having covers composed of a polyurea composition. The polyurea composition disclosed in the '870 patent is a reaction product of an organic isocyanate having at least two functional groups and an organic amine having at least two functional groups. One of the organic isocyanates disclosed by the '870 patent is PPDI.

Although the prior art has disclosed golf ball covers composed of many different polyurethane materials, none of these golf balls have proven completely satisfactory. Dissatisfaction, for example, remains with processing and manufacturing the balls, especially with controlling the reaction time of the curative and prepolymer. If the gel time for formation of a polyurethane material is too fast, the time to place a core in a hemispherical cavity with the gelling pre-polyurethane material and to mate the hemispherical cavity with a corresponding hemispherical cavity is greatly reduced thereby leading to processing problems like air pockets, and centering of the core.

SUMMARY OF INVENTION

The present invention provides a novel solution to the problem of controlling the reaction time of formation of a polyurethane material. The solution is the use of dimethyl methylphosphonate as a component of the prepolymer blend to lower the viscosity of a polyurethane prepolymer, thereby allowing the use of a fast curing agent, like diethyl 2,4-toluenediamine. The lowered viscosity allows for the reaction temperature to be lowered thereby decreasing the gel time for the polyurethane formation. There is a desire to use curing agents such as diethyl 2,4-toluenediamine because such curing agents provide polyurethane materials with less yellowing and greater durability.

One aspect of the present invention is a golf ball including a core and a cover. The cover is composed of a thermosetting polyurethane material formed from reactants composed of prepolymer blend including a polyurethane prepolymer and dimethyl methylphosphonate, and a curative including at least one primary curing agent. The cover has an aerodynamic surface geometry thereon.

Another aspect of the present invention is a golf ball including a core, a boundary layer and a cover. The core is a polybutadiene mixture and has a diameter ranging from 1.35 inches to 1.64 inches. The core also has a PGA compression ranging from 50 to 90. The boundary layer is formed over the core and is composed of a blend of ionomer materials. The boundary layer has a thickness ranging from 0.020 inch to 0.075 inch and a Shore D hardness ranging from 50 to 75 as measured according to ASTM-D2240. The cover is formed over the boundary layer. The cover is composed of a thermosetting polyurethane material formed from reactants including a prepolymer blend composed of a polypropylene glycol terminated toluene diisocyanate prepolymer and 1 to 10 parts dimethyl methylphosphonate, and a curative blend including 20 to 40 parts 4,4'-methylenebis-(3-chloro,2,6-diethyl)-aniline and 80 to 60 parts diethyl 2,4-toluenediamine. The cover has a Shore D hardness ranging from 30 to 60 as measured according to ASTM-D2240. The cover also has a thickness ranging from 0.015 inch to 0.040 inch and an aerodynamic surface geometry thereon.

Having briefly described the present invention, the above and further objects, features and advantages thereof will be recognized by those skilled in the pertinent art from the following detailed description of the invention when taken in conjunction with the accompanying drawings.

DETAILED DESCRIPTION

The polyurethane material of the present invention is formed from reactants comprising a prepolymer blend including a polyurethane prepolymer and dimethyl methylphosphonate, and a curative blend comprising a primary curing agent. The dimethyl methylphosphonate is preferably present in an amount of 1 to 10 parts per one hundred parts of the polyurethane prepolymer, and most preferably 5 parts per one hundred parts of the polyurethane prepolymer. The primary curing agent is preferably diethyl 2,4-toluenediamine. The polyurethane prepolymer is preferably selected from toluene diisocyanate-based polyurethane prepolymers, para-phenylene diisocyanate-based polyurethane prepolymers, and 4,4'-diphenylmethane diisocyanate-based polyurethane prepolymers. The polyurethane prepolymer is preferably utilized alone or in a blend of two or three polyurethane prepolymers. A preferred use of the curative blend is in the formation of thermosetting polyurethane for the cover of a golf ball.

Figure 1:
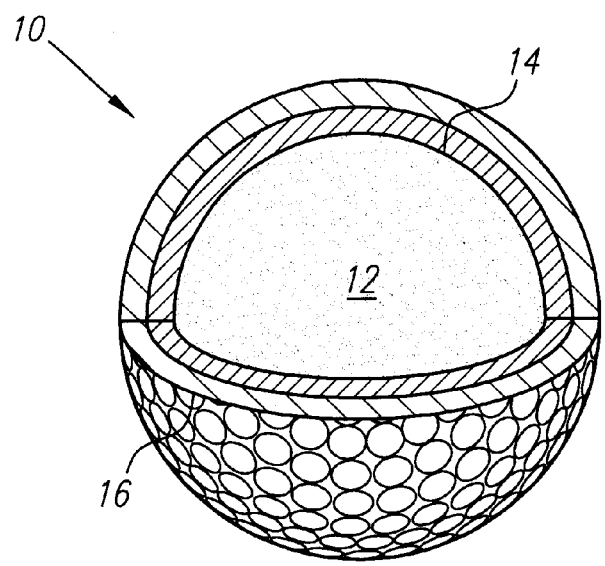
FIG. 1 illustrates a perspective view of a golf ball of the present invention including a cut-away portion showing a core, a boundary layer, and a cover.
Figure 2:
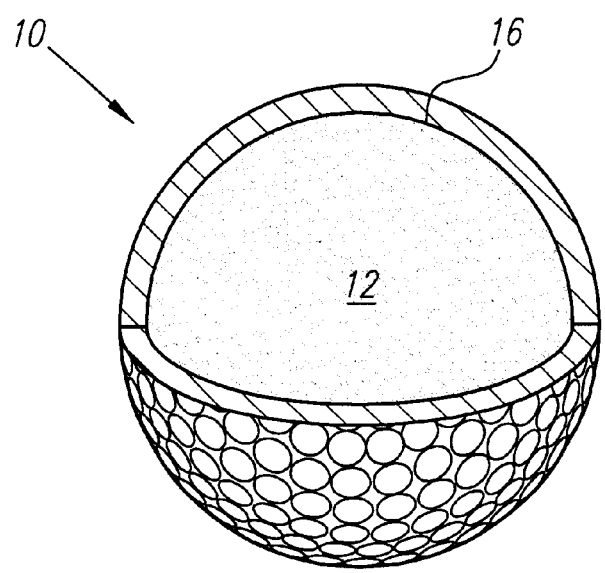
FIG. 2 illustrates a perspective view of a golf ball of the present invention including a cut-away portion core and a cover.

As illustrated in FIG. 1, a golf ball is generally indicated as 10. The golf ball 10 includes a core 12, a boundary layer 14 and a cover 16. Alternatively, as shown in FIG. 2, the golf ball 10 may only include a core 12 and a cover 16. The cover 16 is composed of a thermosetting polyurethane material of the present invention. In a preferred embodiment, the cover 16 is formed over a boundary layer 14 and core 12, as shown in FIG. 1. Alternatively, the cover 16 is formed over the core 12, as shown in FIG. 2. Those skilled in the art will recognize that the core may be solid, hollow, multi-piece or liquid-filled, and the boundary layer may be partitioned into additional layers, without departing from the scope and spirit of the present invention.

The prepolymer blend for a thermosetting polyurethane material of the present invention utilizes dimethyl methylphosphonate to lower the viscosity of the polyurethane prepolymer to control the reaction to form the polyurethane. A preferred dimethyl methylphosphonate is FYROL DMMP available from Akzo Nobel Chemicals of Chicago, Ill. The dimethyl methylphosphonate is blended with at least one polyurethane prepolymer to form the prepolymer blend, however multiple polyurethane prepolymers may be utilized in the prepolymer blend.

As mentioned previously, the preferred primary curing agent is diethyl 2,4-toluenediamine, which is available from Albemarle Corporation of Baton Rouge, La. under the tradename ETHACURE® 100. 4,4'-methylenebis-(3-chloro,2,6-diethyl)-aniline, which is available from Air Products and Chemicals Inc., of Allentown, Pa., under the tradename LONZACURE™, is mixed with the diethyl 2,4-toluenediamine in an alternative embodiment of the curative blend.

The thermosetting polyurethane material is preferably formed from a toluene diisocyanate prepolymer mixed with dimethyl methylphosphonate. The toluene diisocyanate prepolymer is preferably a polypropylene glycol terminated toluene diisocyanate prepolymer or a polytetramethylene ether glycol terminated toluene diisocyanate prepolymer. A preferred polypropylene glycol terminated toluene diisocyanate prepolymer is available from Uniroyal Chemical Company of Middlebury, Conn., under the tradename ADIPRENE® LFG960. A preferred polytetramethylene ether glycol terminated toluene diisocyanate prepolymer is available from Uniroyal Chemical Company of Middlebury, Conn., under the tradename ADIPRENE® LF930. Another toluene diisocyanate prepolymer is a toluene diisocyanate terminated polyether prepolymer available from Uniroyal Chemical Company of Middlebury, Conn., under the tradename ADIPRENE® LF950. The use of multiple polyurethane prepolymers is set forth in U.S. Pat. No. 6,190,268, entitled Golf Ball With A Polyurethane Cover, filed on Jul. 27, 1999, assigned to Callaway Golf Company, and which is hereby incorporated by reference in its entirety.

The dimethyl methylphosphonate is also utilized with a para-phenylene diisocyanate-based polyurethane prepolymer. An example is a para-phenylene diisocyanate terminated polyester prepolymer, which is available from Uniroyal Chemical under the tradename ADIPRENE® LFPX 2950. Another is a para-phenylene diisocyanate terminated polyether prepolymer, which is available from Uniroyal Chemical under the tradename ADIPRENE® LFPX 950.

The dimethyl methylphosphonate is preferably utilized with a single polyurethane prepolymer, a di-blend of polyurethane prepolymers, or a tri-blend of polyurethane prepolymers. However, those skilled in the pertinent art will recognize that greater multiples of polyurethane prepolymers may be utilized with the present invention without departing from the scope and spirit of the claims.

In a preferred embodiment, the curative blend is composed of 100 parts diethyl 2,4-toluenediamine. In an alternative embodiment, the curative blend is composed of 20 to 40 parts 4,4'-methylenebis-(3-chloro,2,6-diethyl)-aniline, and 80 to 60 parts diethyl 2,4-toluenediamine. A most preferred curative blend of this alternative embodiment is composed of 30 parts 4,4'-methylenebis-(3-chloro,2,6-diethyl)-aniline and 70 parts diethyl 2,4-toluenediamine.

The ratio of the polyurethane prepolymer to curative is determined by the nitrogen-carbon-oxygen group (NCO) content of the polyurethane prepolymer. For example, the NCO content of the polypropylene glycol terminated toluene diisocyanate prepolymer is preferably in the range of 3.0% to 6.0%, more preferably in the range of 4.0% to 5.75%, and most preferably 5.70%. The NCO content of the polytetramethylene ether glycol terminated toluene diisocyanate prepolymer is preferably in the range of 3.75% to 7.0%, more preferably in the range of 4.0% to 5.75%, and most preferably 5.70%. The weight ratio of the polyurethane prepolymer to the curative is preferably in the range of about 10:1 to about 30:1.

Prior to curing, the polyurethane prepolymer and curative blend are preferably stored separately. In general, the polyurethane material is formed by first heating and mixing the curative blend. Then, the polyurethane prepolymer and the curative blend are mixed in a chamber. The mixture from the chamber is dispensed into a hemispherical cavity prior to insertion of a golf ball precursor product. The prepolyurethane material is cured by applying heat and pressure for a predetermined period of time. A more specific process is set forth below.

The prepolymer blend is preferably degassed and warmed in a first holding container. The processing temperature for the prepolymer blend is preferably in the range of about 70–130° F., and most preferably in the range of about 80–120° F. The prepolymer blend is preferably flowable from the first holding container to a mixing chamber in a range of about 200–1100 grams of material per minute, or as needed for processing. In addition, the prepolymer material may be agitated in the first holding container, in the range of 0–250 rpm, to maintain a more even distribution of material and to eliminate crystallization.

The curative blend is degassed and warmed in a second holding container. The processing temperature for the curative blend is preferably in the range of about 50–230° F., and most preferably in the range of about 80–200° F. The curative is preferably flowable from the second holding container to the mixing chamber in the range of about 15–75 grams of material per minute, or as needed. Additives may be added to the curative blend as desired.

The polyurethane prepolymer and curative blend are preferably added to the common mixing chamber at a temperature in the range of about 160–220° F. A colorant material, such as, for example, titanium dioxide, barium sulfate, and/or zinc oxide in a glycol or castor oil vinier, and/or other additive material(s) as are well known in the art, may be added to the common mixing chamber. The amount of colorant material added is preferably in the range of about 0–10% by weight of the combined polyurethane prepolymer and curative materials, and more preferably in the range of about 2–8%. Other additives, such as, for example, polymer fillers, metallic fillers, and/or organic and inorganic fillers (e.g. polymers, balata, ionomers, etc.) may be added as well to increase the specific gravity of the polyurethane material. The entire mixture is preferably agitated in the mixing chamber in the range of about 1 to 250 rpm prior to molding. A more detailed explanation of one aspect of the process is set forth in U.S. Pat. No. 6,200,512, entitled Golf Balls And Methods Of Manufacturing The Same, filed on Apr. 20, 1999, assigned to Callaway Golf Company, and which is hereby incorporated by reference in its entirety. A more detailed explanation of the casting system is set forth in U.S. Pat. No. 6,395,218, entitled System And Method For Forming A Thermoset Golf Ball Cover, filed on Feb. 1, 2000, assigned to Callaway Golf Company, and which is hereby incorporated by reference in its entirety.

The cover 16 is formed over a golf ball precursor product, which is either a core, a core with at least one boundary layer, or a core with windings. The core 12 of the golf ball 10 is the engine for the golf ball 10 such that the inherent properties of the core 12 will strongly determine the initial velocity and distance of the golf ball 10. A higher initial velocity will usually result in a greater overall distance for a golf ball. In this regard, the Rules of Golf, approved by the United States Golf Association (USGA) and The Royal and Ancient Golf Club of Saint Andrews, limits the initial velocity of a golf ball to 250 feet (76.2m) per second (a two percent maximum tolerance allows for an initial velocity of 255 per second) and the overall distance to 280 yards (256m) plus a six percent tolerance for a total distance of 296.8 yards (the six percent tolerance may be lowered to four percent). A complete description of the Rules of Golf is available on the USGA web page at www.usga.org. Thus, the initial velocity and overall distance of a golf ball must not exceed these limits in order to conform to the Rules of Golf. Therefore, the core 12 for a USGA approved golf ball is constructed to enable the golf ball 10 to meet, yet not exceed, these limits.

The coefficient of restitution (COR) is a measure of the resilience of a golf ball. The COR is a measure of the ratio of the relative velocity of the golf ball after direct impact with a hard surface to the relative velocity before impact with the hard surface. The COR may vary from 0 to 1, with 1 equivalent to a completely elastic collision and 0 equivalent to a completely inelastic collision. A golf ball having a COR value closer to 1 will generally correspond to a golf ball having a higher initial velocity and a greater overall distance. If the golf ball has a high COR (more elastic), then the initial velocity of the golf ball will be greater than if the golf ball has a low COR. In general, a higher compression core will result in a higher COR value.

The core 12 of the golf ball 10 is generally composed of a blend of a base rubber, a cross-linking agent, a free radical initiator, and one or more fillers or processing aids. A preferred base rubber is a polybutadiene having a cis-1,4 content above 90%, and more preferably 98% or above.

The use of cross-linking agents in a golf ball core is well known, and metal acrylate salts are examples of such cross-linking agents. For example, metal salt diacrylates, dimethacrylates, or mono(meth)acrylates are preferred for use in the golf ball cores of the present invention, and zinc diacrylate is a particularly preferred cross-linking agent. A commercially available suitable zinc diacrylate is SR-416 available from Sartomer Co., Inc., Exton, Pa. Other metal salt di- or mono- (meth)acrylates suitable for use in the present invention include those in which the metal is calcium or magnesium. In the manufacturing process it may be beneficial to pre-mix some cross-linking agent(s), such as, e.g., zinc diacrylate, with the polybutadiene in a master batch prior to blending with other core components.

Free radical initiators are used to promote cross-linking of the base rubber and the cross-linking agent. Suitable free radical initiators for use in the golf ball core 12 of the present invention include peroxides such as dicumyl peroxide, bis-(t-butyl peroxy) diisopropyl benzene, t-butyl perbenzoate, di-t-butyl peroxide, 2,5-dimethyl-2,5-di-5-butylperoxy-hexane, 1,1-di (t-butylperoxy) 3,3,5-trimethyl cyclohexane, and the like, all of which are readily commercially available.

Zinc oxide is also preferably included in the core formulation. Zinc oxide may primarily be used as a weight adjusting filler, and is also believed to participate in the cross-linking of the other components of the core (e.g. as a coagent). Additional processing aids such as dispersants and activators may optionally be included. In particular, zinc stearate may be added as a processing aid (e.g. as an activator). Any of a number of specific gravity adjusting fillers may be included to obtain a preferred total weight of the core 12. Examples of such fillers include tungsten and barium sulfate. All such processing aids and fillers are readily commercially available. The present inventors have found a particularly useful tungsten filler is WP102 Tungsten (having a 3 micron particle size) available from Atlantic Equipment Engineers (a division of Micron Metals, Inc.), Bergenfield, N.J.

Table One below provides the ranges of materials included in the preferred core formulations of the present invention.

TABLE ONE

| Component | Preferred Range | Most Preferred Range |
| --- | --- | --- |
| Polybutadiene | 100 parts | 100 parts |
| Zinc diacrylate | 20–35 phr | 25–30 phr |
| Zinc oxide | 0–50 phr | 5–15 phr |
| Zinc stearate | 0–15 phr | 1–10 phr |
| Peroxide | 0.2–2.5 phr | 0.5–1.5 phr |
| Filler (e.g. tungsten) | As desired (e.g. 2–10 phr) | As desired (e.g. 2–10 phr) |

In the present invention, the core components are mixed and compression molded in a conventional manner known to those skilled in the art. In a preferred form, the finished core 12 has a diameter of about 1.35 to about 1.64 inches for a golf ball 10 having an outer diameter of 1.68 inches. The core weight is preferably maintained in the range of about 32 to about 40 g. The core PGA compression is preferably maintained in the range of about 50 to 90 and most preferably about 55 to 80.

As used herein, the term PGA compression is defined as follows:

PGA compression value=180 Riehle compression value

The Riehle compression value is the amount of deformation of a golf ball in inches under a static load of 200 pounds, multiplied by 1000. Accordingly, for a deformation of 0.095 inches under a load of 200 pounds, the Riehle compression value is 95 and the PGA compression value is 85.

As is described above, the present invention preferably includes at least one boundary layer 14 that preferably is composed of a thermoplastic (e.g. thermoplastic or thermoplastic elastomer) or a blend of thermoplastics (e.g. metal containing, non-metal containing or both). However, the golf ball 10 may have several boundary layers 14 disposed between the core 12 and the cover 16. Most preferably the boundary layer 14 is composed of at least one thermoplastic that contains organic chain molecules and metal ions. The metal ion may be, for example, sodium, zinc, magnesium, lithium, potassium, cesium, or any polar metal ion that serves as a reversible cross-linking site and results in high levels of resilience and impact resistance. Suitable commercially available thermoplastics are ionomers based on ethylene copolymers and containing carboxylic acid groups with metal ions such as described above. The acid levels in such suitable ionomers may be neutralized to control resiliency, impact resistance and other like properties. In addition, other fillers with ionomer carriers may be used to modify (e.g. preferably increase) the specific gravity of the thermoplastic blend to control the moment of inertia and other like properties. Exemplary commercially available thermoplastic materials suitable for use in a boundary layer 14 of a golf ball 10 of the present invention include, for example the following materials and/or blends of the following materials: HYTREL® and/or HYLENE® products from DuPont, Wilmington, Del., PEBAX® products from Elf Atochem, Philadelphia, Pa., SURLYN® products from DuPont, and/or ESCOR® or IOTEK® products from Exxon Chemical, Houston, Tex.

The Shore D hardness of the boundary layer 14 ranges from 50 to 75, as measured according to ASTM D2290. It is preferred that the boundary layer 14, have a hardness of between about 55–70 Shore D. In a preferred embodiment, the boundary layer 14 has a Shore D hardness in the range of 58–65. One reason for preferring a boundary layer 14 with a Shore D hardness of 75 or lower is to improve the feel of the resultant golf ball. It is also preferred that the boundary layer 14 is composed of a blend of SURLYN® ionomer resins. SURLYN® 8150, 9150, and 6320 are, respectively, an ionomer resin composed of a sodium neutralized ethylene/methacrylic acid, an ionomer resin composed of a zinc neutralized ethylene/methacrylic acid, and an ionomer resin composed of a terpolymer of ethylene, methacrylic acid and n-butyl acrylate partially neutralized with magnesium, all of which are available from DuPont, Polymer Products, Wilmington, Del.

Exemplary golf balls of the present invention were constructed and compared to the unpainted CALLAWAY GOLF RULE 35 SOFTFEEL golf ball. Table Two and Table Three set forth the physical properties of the exemplary group of golf balls #1, #2 and #3. A dozen golf balls were constructed for each group #1, #2 and #3. Each of the boundary layers 14 of the exemplary golf balls #1, #2 and #3 were composed of an ionomer blend of forty-five weight percent SURLYN 8150, forty-five weight percent SURLYN 9150 and ten weight percent SURLYN 6350. The average thickness of each of the boundary layers 14 of the exemplary golf balls

1, #2 and #3 was 0.0525 inch. The Shore D hardness of the boundary layer 14 of the exemplary golf balls #1, #2 and #3 was 62 points. The Shore D hardness provided in Table Three below was determined according to ASTM D2240.

Each of the covers 16 of the exemplary group of golf balls #1 were composed of a prepolymer blend of 50 parts per weight of polytetramethylene ether glycol terminated toluene diisocyanate prepolymer (ADRIPRENE LF930), 50 parts per weight of polyether terminated toluene diisocyanate prepolymer (ADRIPRENE LF950) and dimethyl methylphosphonate in an amount of 5 parts per hundred parts of the polyurethane prepolymers, and cured with a diethyl 2,4-toluenediamine (E100). Each of the covers 16 of the exemplary group of golf balls #2 were composed of a prepolymer blend of 100 parts per weight of polytetramethylene ether glycol terminated toluene diisocyanate prepolymer (ADRIPRENE LF930) and dimethyl methylphosphonate in an amount of 5 parts per hundred parts of the polyurethane prepolymer, and cured with a diethyl 2,4-toluenediamine (E100). Each of the covers 16 of the exemplary group of golf balls #3 were composed of a prepolymer blend of 100 parts per weight of polypropylene glycol terminated toluene diisocyanate prepolymer (ADRIPRENE LFG960) and dimethyl methylphosphonate in an amount of 5 parts per hundred parts of the polyurethane prepolymers, and cured 30 parts 4,4'-methylenebis-(3-chloro,2,6-diethyl)-aniline (LONZACURE) and 70 parts diethyl 2,4-toluenediamine (E100). Each of the covers 16 of the exemplary group of golf balls #4, #5, #6 and #7 were composed of a prepolymer blend of 100 parts per weight of polytetramethylene ether glycol terminated toluene diisocyanate prepolymer (ADRIPRENE LF930) and dimethyl methylphosphonate in an amount of 2.5 parts per hundred parts of the polyurethane prepolymer, and cured with a diethyl 2,4-toluenediamine (E100). The average thickness of each of the covers 16 of the exemplary golf balls #1, #2 and #3 was 0.030 inch. The Shore D hardness of the covers 16 of the exemplary golf balls #1, #2 and #3 was 51 points. The COR at 143 feet per second of each of the exemplary golf balls #1, #2 and #3 was 79.42 points.

TABLE TWO

| Ball | Bound. Layer Shore D (points) | Cover Shore D (points) | Bound. Layer Thickness (inch) | Cover Thickness (inch) | Cover COR (points) | Ball |
|---|---|---|---|---|---|---|
| 1 | 62 | — | 0.0525 | 0.03 | 78.80 |
| 2 | 62 | 50 | 0.0525 | 0.03 | 79.97 |
| 3 | 62 | — | 0.0525 | 0.03 | 79.40 |
| 4 | 62 | 51 | 0.0525 | 0.03 | — |
| 5 | 62 | 51 | 0.0525 | 0.03 | — |
| 6 | 62 | 51 | 0.0525 | 0.03 | — |
| 7 | 62 | 51 | 0.0525 | 0.03 | — |

The average weight of each of the exemplary golf balls #1, #2 and #3 was 45.24 grams, 45.06 grams and 45.38 grams respectively. The average PGA compression of each of the exemplary golf balls #1, #2 and #3 was 99 points, 99 points and 101 points respectively. The average PGA compression of each of the exemplary golf balls #4–#7 was 100 points. The average diameter of each of the exemplary golf balls #1–#7 was approximately 1.680 inches. The core diameter of each of the cores 12 of each of the exemplary golf balls #1–#7 was 1.515 inches. The PGA compression of each of the cores 12 of each of the exemplary golf balls #1–#7 was 70 points.

TABLE THREE

| Ball | Ball Weight (grams) | Ball Compression (points) | Average Ball Diameter (inches) | Core Diameter (inches) | Core Compression (points) |
|---|---|---|---|---|---|
| 1 | 45.24 | 99 | 1.680 | 1.515 | 70 |
| 2 | 45.06 | 99 | 1.679 | 1.515 | 70 |
| 3 | 45.38 | 101 | 1.681 | 1.515 | 70 |
| 4 | 45.32 | 100 | 1.683 | 1.515 | 70 |
| 5 | 45.32 | 100 | 1.683 | 1.515 | 70 |
| 6 | 45.32 | 100 | 1.683 | 1.515 | 70 |
| 7 | 45.32 | 100 | 1.683 | 1.515 | 70 |

Tables Four and Five compare the CALLAWAY GOLF RULE 35 SOFTFEEL golf ball to the exemplary golf balls #4, #5, #6 and #7 of the present invention. All of the golf balls were unpainted. Exemplary golf balls #4 and #6, and the RULE 35 SOFTFEEL #1 and #3 were post-cured in a convection oven while exemplary golf balls #5 and #7, and the RULE 35 SOFTFEEL #2 and #4 were post-cured in a Lanley oven. The golf balls were measured to determine the yellowing of the thermosetting polyurethane covers after exposure to sunlight. The color of the cover of each of the golf balls is determined using a HUNTER COLORIMETER model ULTRA SCAN XE and measuring the color on a L.a.b. scale. On the L scale, a measurement of 100 corresponds to complete white while a measurement of 0 corresponds to complete black. On the a scale, a negative number corresponds to a green color while a positive number corresponds to a red color. On the b scale, a negative number corresponds to a blue color while a positive number corresponds to a yellow color. Thus, the more positive the b measurement, the more yellow the cover. The golf balls were measured before exposure to sunlight, after four hours of exposure to sunlight and after twenty-four hours of exposure to sunlight/night.

TABLE FOUR

| | Before Exposure | | | After 4 Hour Exposure | | | Difference | | |
|---|---|---|---|---|---|---|---|---|---|
| Ball | L | a* | b* | L | a* | b* | L | a* | b* |
| Rule 35 Soft #1 | 96.67 | −1.44 | 4.6 | 79.38 | 6.66 | 36.35 | −17.29 | 8.1 | 31.75 |
| Rule 35 Soft #2 | 95.31 | −1.94 | 11.92 | 78.27 | 7.49 | 35.67 | −17.04 | 9.43 | 23.75 |
| Ex. 4 | 95.37 | −1.52 | 1.76 | 93.75 | −2.04 | 8.37 | −1.62 | −0.52 | 6.61 |
| Ex. 5 | 95.75 | −2.16 | 4.61 | 94.66 | −2.0 | 8.04 | −1.09 | 0.16 | 3.43 |

TABLE FIVE

| | Before Exposure | | | After 24 Hour Exposure | | | Difference | | |
|---|---|---|---|---|---|---|---|---|---|
| Ball | L | a* | b* | L | A* | b* | L | a* | b* |
| Rule 35 Soft #3 | 95.42 | −1.44 | 3.86 | 73.62 | 11.12 | 42.68 | −21.8 | 12.56 | 38.82 |
| Rule 35 Soft #4 | 94.24 | −1.82 | 11.16 | 72.08 | 11.83 | 41.37 | −22.16 | 13.65 | 30.21 |

TABLE FIVE-continued

| Ball | Before Exposure | | | After 24 Hour Exposure | | | Difference | | |
|---|---|---|---|---|---|---|---|---|---|
| | L | a* | b* | L | A* | b* | L | a* | b* |
| Ex. 6 | 97.1 | −1.53 | 2.66 | 94.59 | −1.77 | 11.78 | −2.51 | −0.24 | 9.12 |
| Ex. 7 | 94.62 | −2.39 | 4.85 | 91.67 | −1.71 | 16.14 | −2.95 | 0.68 | 11.29 |

As is shown in Tables Four and Five, the exemplary golf balls #4 and #5 of the present invention have a lower yellow measurement (b scale) before exposure, and a lower increase in yellowing after four hours and twenty four hours as compared to the CALLAWAY GOLF RULE 35 SOFTFEEL golf balls. For example, the #4 golf ball of the present invention had a b measurement of 1.76 before exposure and a measurement of 8.37 after four hours of exposure to sunlight. The #1 CALLAWAY GOLF RULE 35 SOFTFEEL golf ball had a b measurement of 4.6 before exposure and a measurement of 36.35 after four hours of exposure to sunlight. The golf balls were exposed to sunlight on the rooftop of a building in Carlsbad, Calif. (latitude 32 46 30 north, longitude 117 25 06 west) on a winter day. Thus, not only do the covers 16 of the golf balls of the present invention have less yellowing to begin with, after exposure to sunlight the covers 16 yellow less than other covers composed of thermosetting polyurethane.

TABLE SIX

| Ball | Prepolymer Blend | NCO % | Curative | Pre-polymer Blend Temp. | Pre-polymer Blend press |
|---|---|---|---|---|---|
| Ex. 8 | LF930:DMMP | 5.06 | E100 | 120 | 175 |
| Ex. 9 | LF930:DMMP | 5.15 | E100 | 117 | 185 |
| Ex. 10 | LF930/LF950:DMMP | 5.67 | E100 | 117 | 179 |
| Ex. 11 | LF950:DMMP | 6.18 | E100/LNZA | 107 | 207 |
| Ex. 12 | LFG960:DMMP 5.70 | | E100/LNZA | 113 | 212 |
| Comp. 1 | LFG960 | — | E100/LNZA | 115 | 245 |
| Comp. 2 | LF930 | — | E100 | 120 | 209 |

TABLE SEVEN

| Ball | Plaque Hardness | Plaque Flex. Mod. | Curative Temp. | Gel Temp. | Gel Time |
|---|---|---|---|---|---|
| Ex. 8 | 50 | 9617 | 93 | 150 | 77 |
| Ex. 9 | 49 | 10308 | 93 | 145 | 86 |
| Ex. 10 | 53 | 11987 | 93 | 150 | 81 |
| Ex. 11 | 52 | 8343 | 91 | 150 | 94 |
| Ex. 12 | 50 | 17843 | 90 | 150 | 90 |
| Comp. 1 | — | — | 91 | 150 | 75 |
| Comp. 2 | — | — | 89 | 150 | 72 |

Tables Six and Seven illustrate the processing benefits of using dimethyl methylphosphonate in a prepolymer blend. The dimethyl methylphosphonate, listed in the tables as DMMP, lowers the viscosity of the prepolymer blend thereby reducing the prepolymer blend pressure and the temperature for processing. The gel time is also slightly increased for the prepolymer blends containing dimethyl methylphosphonate. In Tables Six and Seven, all of the temperatures are in Fahrenheit, all of the pressure are in pounds per square inch, the hardness measurements are in Shore D and the flexural modulus measurements are in pounds per square inch. All of the curatives contained diethyl 2,4-toluenediamine (E100), with examples #11 and 12 having 30 parts 4,4'-methylenebis-(3-chloro,2,6-diethyl)-aniline (LONZACURE) with 70 parts diethyl 2,4-toluenediamine (E100). As compared to the comparison balls 1 and 2, the prepolymer blend pressure was much lower as was the prepolymer blend temperature. The gel time was also slightly increased as compared to the non-dimethyl methylphosphonate prepolymer blends.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention:

1. A method for forming a cover for a golf ball, the method comprising:

blending a mixture of a polyurethane prepolymer and dimethyl methylphosphonate to create a prepolymer blend;

mixing the prepolymer blend with a curing agent in a mixing chamber to create pro-polyurethane mixture;

dispensing the pro-polyurethane mixture into a first hemispherical cavity and a second hemispherical cavity;

placing a golf ball precursor product into the first hemispherical cavity with the pro-polyurethane mixture therein;

mating the first hemispherical cavity with the second hemispherical cavity; and curing the pro-polyurethane mixture to create a polyurethane cover on the golf ball precursor product.

2. The method according to claim 1 wherein the curative blend is heated at a temperature of from 100° F. to 130° F.

3. The method according to claim 1 wherein the curative blend further comprises diethyl 2,4-toluenediamine.

4. The method according to claim 3 wherein the curative blend further comprises 4,4'-methylenebis-(3-chloro,2,6-diethyl)-aniline.

\* \* \* \* \*

UNITED STATES PATENT AND TRADEMARK OFFICE
CERTIFICATE OF CORRECTION

PATENT NO. : 6,607,686 B2
DATED : August 19, 2003
INVENTOR(S) : Dewanjee

It is certified that error appears in the above-identified patent and that said Letters Patent is hereby corrected as shown below:

Column 5,
Line 3, "have" should be -- has --.

Column 14,
Line 39, "curing agent" should be -- curative blend --.

Signed and Sealed this

Third Day of February, 2004

JON W. DUDAS
*Acting Director of the United States Patent and Trademark Office*